United States Patent
Tschope et al.

[11] Patent Number: 6,078,712
[45] Date of Patent: Jun. 20, 2000

[54] CONNECTING CABLE FOR CONTROL UNITS

[75] Inventors: Jurgen Tschope, Selm; Bernd-Ernst Launhardt, Datteln, both of Germany

[73] Assignee: DBT Automation GmbH, Essen, Germany

[21] Appl. No.: 08/923,569

[22] Filed: Sep. 4, 1997

[30] Foreign Application Priority Data

Sep. 6, 1996 [DE] Germany .......................... 196 36 162

[51] Int. Cl.[7] ..................................................... G02B 6/44
[52] U.S. Cl. ........................... 385/101; 385/88; 385/89; 385/94; 250/227.24; 250/551
[58] Field of Search ............................... 385/88–94, 101; 250/227.24, 551

[56] References Cited

U.S. PATENT DOCUMENTS

| | | | |
|---|---|---|---|
| 3,878,397 | 4/1975 | Robb et al. | 385/88 |
| 4,595,839 | 6/1986 | Braum et al. | 385/89 |
| 4,767,168 | 8/1988 | Grandy | 385/88 |
| 5,666,453 | 9/1997 | Dannenmann | 385/101 |
| 5,764,043 | 6/1998 | Czosnowski et al. | 385/101 |

*Primary Examiner*—Hemang Sanghavi
*Attorney, Agent, or Firm*—Bauer & Schaffer, LLP

[57] ABSTRACT

A cable for connecting control units of powered supports to each other to prevent simultaneous movement of two adjacent powered supports in underground mining. The cable includes plug housings, at least one optical waveguide, connecting elements, optoelectric transducers, and potting. Each housing contains a chamber and has an electric plug-in coupling that connects to the control units. The at least one optical waveguide has ends with light entry and light exit surfaces. The connecting elements are arranged at the ends of the at least one optical waveguide and are arranged in the chamber in a respective plug housing. The optoelectric transducers are connected to the connecting elements and are arranged in the chamber of the respective plug housing and transmit data between the control units. The potting fills the chamber in the respective plug housing and encases the connecting elements and the optoelectric transducers to assure virtually 100% exclusion of air which prevents all kinds of dust, dirt, and moisture, which are present to a great extent in underground mining, from penetrating into the optoelectric transducers and contaminating the light entry and the light exit surfaces of the at least one optical waveguide which assures reliable date transmission, and further reliably locks the optoelectric transducers and the connecting elements in the chamber in the respective plug housing.

14 Claims, 1 Drawing Sheet

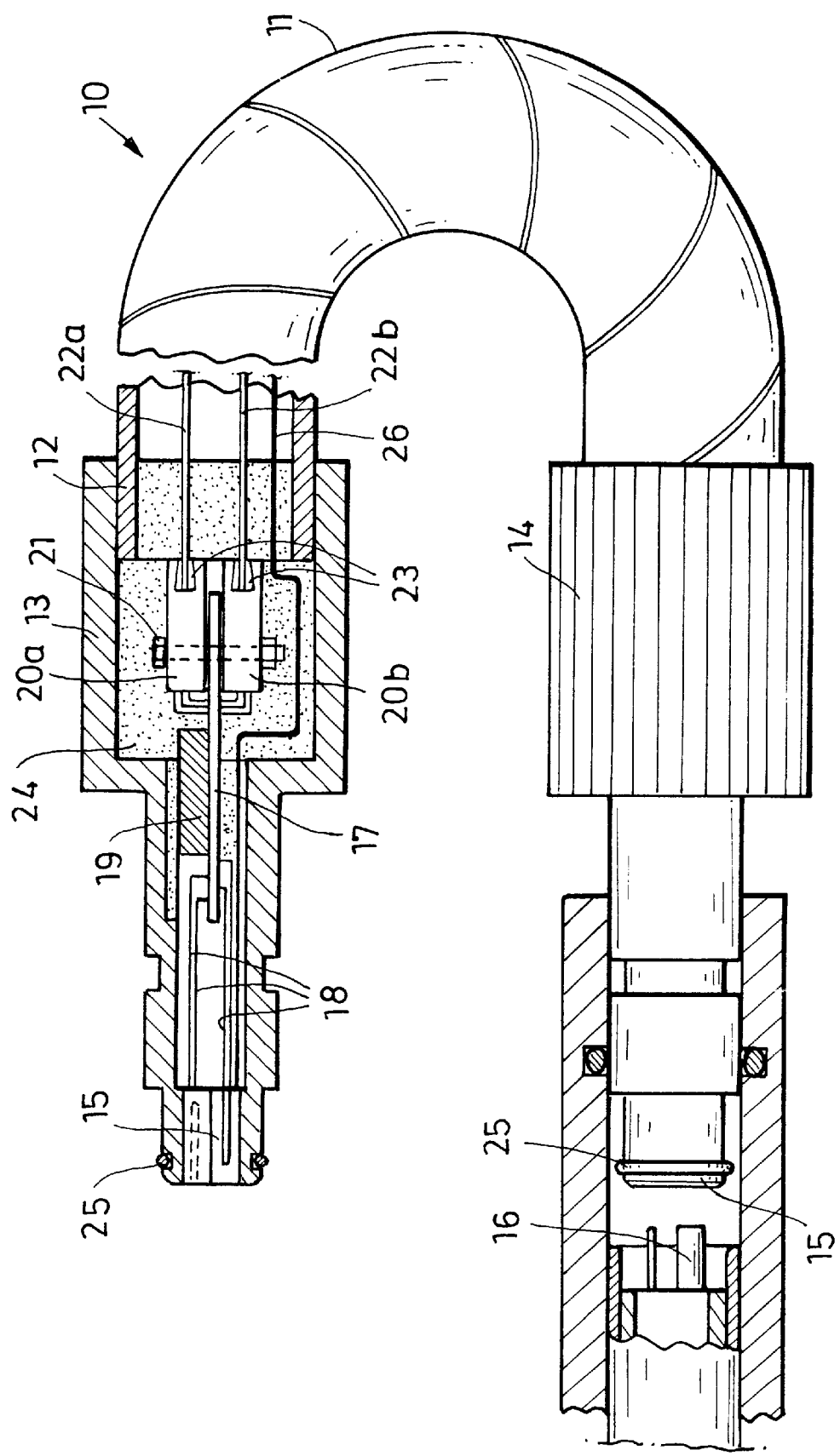

CONNECTING CABLE FOR CONTROL UNITS

FIELD OF THE INVENTION

The invention relates to a connecting cable, in particular, for control units of powered support controllers in underground mining, having at least one optical waveguide with connecting elements which are arranged at the ends and are connected to optoelectric transducers for transmitting data between the control units or the like.

BACKGROUND OF THE INVENTION

The transmission of data using optical waveguides is already known in a large number of applications. Optical waveguides have the advantages, by comparison with the conventional copper conductors, that they permit transmission of the highest data rates with the highest ranges to a large extent free of losses, and that even if the optical waveguide is damaged there is no risk of forming a spark. This makes the use of optical waveguides in the transmission of data in environments which are threatened by fire and explosion particularly advantageous.

The considerations above have led to attempts to use optical waveguides for connecting cables for control units even in underground mining, for example for powered support controllers for self-advancing extraction, which are connected to one another in order to control the moving forward of the individual powered supports which are located alongside one another, in the desired manner. However, in order to be able to connect such optical waveguide cables to the available control units, these had generally to be retrofitted with the optoelectric transducers which are necessary for this, to which transducers the connecting elements of the optical waveguides could then be coupled. The main disadvantage of the known optical waveguide cables is, however, that they are extremely susceptible to the dust which is present to a great extent in underground mining and which can penetrate into the opto-electric transducers and contaminate the light entry or exit surfaces of the optical waveguides, with the result that reliable data transmission is no longer ensured. For this reason, optical waveguides have not become widespread for the transmission of data in severely dusty atmospheres.

SUMMARY OF THE INVENTION

The invention provides a connecting cable of the type mentioned at the beginning with which it is possible, by means of optical waveguides, to transmit large quantities of data in a reliable manner even over great distances, contamination of the optoelectric transducers and or the optical waveguides at their light entry and exit surfaces being reliably avoided.

The invention is achieved by the connecting elements and the optoelectric transducers being arranged in plug housings against the cable ends, the said housings being divided with electric plug-in couplings for connection to the control units. According to the invention, therefore, the transition from the electrical to the optical transmission of the data is transferred out of the control unit itself into the plug housings of the cable, where the optoelectric transducers and, the optical waveguide ends provided with the connecting elements are arranged in a manner which is protected against any access from the outside and hence also against penetration of dust. The connecting elements and/or optoelectric transducers in the plug housings can advantageously further be potted for this purpose, for example using synthetic resin, which not only achieves virtually 100% exclusion of air but also reliably locks the individual components in the plug housing. Hence the only items which are accessible from outside are the electric plug-in couplings for the connection to the control units, but these do not present any problem points with regard to contamination by dust or the like. The invention has the additional advantage that the computers (control units), measuring sensors, indicator devices and the like which are connected to one another using the cables do not have to be re-equipped in order to enable the use of optical waveguides, since the electric plug-in couplings were already used in the known electric connecting cables without optical waveguides. This means that the conventional electric connecting cables can be replaced by the connecting cable with optical waveguides according to the invention without any kind of complicated re-equipping work on the individual control units, and hence their special advantages in relation to transmission speed and explosion safety can be obtained.

For bidirectional data exchange, at least two optical waveguides are preferably provided in the cable. The two plug housings at the cable ends then each have an optical transmitter and an optical receiver (optoelectric transducer), the transmitter for feeding the light signals into the optical waveguide being able to use a light-emitting diode or laser diode, and the receiver for scanning the light signals transmitted by means of the optical waveguide being able to use a PIN avalanche photodiode. In a particularly preferred refinement of the invention, circuit electronics for operating the opto-electric transducers are also arranged in the plug housings, which makes it possible to carry out a signal conversion from signals of one signal format into another signal format in the plug housing itself. Furthermore, it is of course possible for the entire electronics required for modulation, amplification and demodulation of the signals transmitted using the cable to be contained in the plug housings. If, in addition to the information signals transmitted via the optical waveguide or optical waveguides, electric power is also intended to be transmitted between the control units to be connected using the cable, the cable can additionally be provided with at least one electric line between the plug-in couplings, which then allows the transmission of power at the desired voltage. The optical waveguides and, if appropriate, the electric line(s), are preferably surrounded, between the plugin couplings or plug housings, by a protective hose, which may be provided with armouring, for example one made of a steel fabric. Hoses of this type are often used as high-pressure hoses in hydraulic control systems. Mechanical damage to the lines running in the protective hose is therefore practically ruled out. The flexible protective hose at the same time enables simple connection of the cable to the connections provided therefor at the control units.

The plug housings are expediently provided, in the region of their plug-in couplings, with a sealing ring which reliably prevents any entry of dust and moisture into the electric plug-in connection between cable and control unit.

Further features and advantages of the invention emerge from the following description and the drawing, in which a preferred embodiment of the invention is explained in more detail using an example.

BRIEF DESCRIPTION OF THE DRAWING

FIG. 1 shows a connecting cable according to the invention, partially in section.

DETAILED DESCRIPTION OF THE EMBODIMENTS

In the drawing, 10 designates a connecting cable which is used for connecting the control units of two adjacent powered supports, as have been known for a long time in underground mining for supporting the roof in the region of an extraction machine and the associated conveyor. With the progressive mining of the coal or the like to be conveyed, these powered supports move forward one after the other in such a way that a powered support first retracts its supporting cylinder and then advances in the direction of the mining face with the aid of its moving cylinder, in order subsequently to extend the supporting cylinder once more in order to support the roof. The powered support adjacent to the first support is subsequently moved forward in the same manner. In order to avoid two adjacent powered supports being advanced at the same time, the control units are connected to one another using the cable 10 for data exchange.

The cable 10 essentially comprises an armoured protective hose 11, which opens in the plug housings 13, 14 at both ends 12. The plug housings 13, 14, which are constructed as turned brass parts, are provided at their front ends with plug-in couplings 15, via which the electrical connection to the control units takes place via connecting sockets 16 arranged thereon.

Arranged in the interior of the plug housings 13, 14 is a circuit board 17, which is connected to the contacts of the plug-in coupling 15 via electric lines 18. The circuit board 17 carries circuit electronics 19—shown only schematically in the drawing—and two optoelectric transducers 20, namely an optical transmitter 20a having a light-emitting diode (LED) (not shown) and an optical receiver 20b having a PIN avalanche photodiode (likewise not shown). Transmitter 20a and receiver 20b are fastened to the circuit board with a common fastening screw 21 and are connected to the contacts of the plug-in coupling 15 via the circuit electronics 19 and the electric lines 18. An optical waveguide 22a, 22b is connected to each of the optoelectric transducers 20 by means of connecting elements 23. The optical waveguides run in the protective hose 11 and connect the optoelectric transducers of the two plug housings 13.

The circuit board 17 with the circuit electronics arranged thereon and the optical transmitter and receiver is potted in the plug housing 13 using a hardened potting compound 24, for example using synthetic resin, so that no kind of moisture, dirt or the like can get to the sensitive electronic and optical components. In its installed condition in the connecting socket 16, the plug-in coupling 15 is also sealed by means of an O ring 25 so that here, too, neither dirt nor moisture can impair the operational reliability of the plug-in connection.

In the exemplary embodiment illustrated, in addition to its two optical waveguides 22a,b, the cable is further provided with a power supply conductor 26, which is also guided in the protective hose 11 and, via the plug-in couplings 15 at both ends, also allows the transmission of power between the two powered support controllers connected using the cable 10.

The cable according to the invention has, on the outside, only electric connections such as were also used previously for connecting cables with copper lines; the cables according to the invention can therefore replace the previously usual copper cables without any kind of change to the connecting sockets on the control units. At the same time, they offer data security and a data transfer rate which are significantly higher than the previously used cables, by means of the optical waveguides, which, in contrast with the conventional copper wire conductors, cannot be influenced by electromagnetic fields, such as are produced, for example in the mining area, by large cables. The enormous data transfer speeds through the optical waveguides allow time-critical sequences to be monitored and controlled in a significantly improved way, which has an advantageous influence in the case of so-called real-time displays. Furthermore, the cable according to the invention has the special advantage that if the optical waveguides are damaged, no electrical short circuit occurs and there is thus no formation of sparks, which must be avoided absolutely in atmospheres which are threatened by explosion, such as in underground coal mining.

The invention is not restricted to the exemplary embodiment illustrated and described, rather many modifications are conceivable without going beyond the bounds of the invention. Thus, for example, the protective hose surrounding the conductors can also additionally be filled with a soft elastic compound, so that the conductors laid therein cannot touch one another or chafe on one another. The optoelectric transducers can also be connected directly to the electric lines 18 of the plug-in coupling 15, the entire circuit electronics which are necessary to control the optical transmitter and receiver then being located at the control units. The cable can also be used to transmit measured values determined by means of measured sensors to an indicator and/or control device, for example for transmitting pressure measured values of hydraulic pressures to a pressure indicating device which is located at a distance.

What is claimed is:

1. A cable for connecting control units of powered supports to each other to prevent simultaneous movement of two adjacent powered supports in underground mining, said cable comprising:
   a) plug housings, each of which containing a chamber and having an electric plug-in coupling for connecting to the control units;
   b) at least one optical waveguide having ends with light entry and light exit surfaces;
   c) connecting elements arranged at said ends of said at least one optical waveguide and arranged in said chamber in a respective plug housing of said plug housings;
   d) optoelectric transducers connected to said connecting elements and arranged in said chamber in said respective plug housing of said plug housings for transmitting data between the control units; and
   e) potting filling said chamber in said respective plug housing of said plug housings and encasing said connecting elements and said optoelectric transducers for assuring substantially 100% exclusion of air which prevents all kinds of dust, dirt, and moisture, which are present to a great extent in underground mining, from penetrating into said optoelectric transducers and contaminating said light entry and said light exit surfaces of said at least one optical waveguide which assures reliable data transmission, and further reliably locking said optoelectric transducers and said connecting elements in said chamber in said respective plug housing of said plug housings.

2. The cable as defined in claim 1, wherein said at least one optical waveguide is two optical waveguides for bi-direction data exchange.

3. The cable as defined in claim 1; further comprising circuit electronics operating said optoelectric transducers and being arranged in said plug housings.

4. The cable as defined in claim 1; further comprising at least one electrical line arranged between said electric plug-in coupling of one plug housing of said plug housings to said electrical plug-in coupling of another plug housing of said plug housings for transmission of power at a desired voltage.

5. The cable as defined in claim 1; further comprising a protective hose surrounding said at least one optical waveguide.

6. The cable as defined in claim 5, wherein said protective hose is provided with armoring.

7. The cable as defined in claim 5, wherein said protective hose is a steel fabric for practically ruling out mechanical damage to said at least one optical waveguide.

8. The cable as defined in claim 5; further comprising soft elastic compound filling said protective hose and preventing said at least one optical waveguide from touching and chafing another said at least one optical waveguide.

9. The cable as defined in claim 1, wherein said electric plug-in coupling of each plug housing of said plug housings is provided with a sealing ring for preventing all kinds of dust, dirt, and moisture from entering and impairing operational reliability of said electric plug-in coupling of each plug housing of said plug housings.

10. The cable as defined in claim 1, wherein said potting is synthetic resin.

11. The cable as defined in claim 1, wherein at least one optoelectric transducer of said optical transducers is a light emitting diode for feeding light signals into said at least one optical waveguide.

12. The cable as defined in claim 1, wherein at least one optoelectric transducer of said optical transducers is a laser diode for feeding light signals into said at least one optical waveguide.

13. The cable as defined in claim 1, wherein at least one optoelectric transducer of said optical transducers is a PIN avalanche photodiode for scanning light signals transmitted by said at least one optical waveguide.

14. The cable as defined in claim 1, wherein said plug housings are turned brass.

* * * * *